Feb. 13, 1934.  F. ALLENDORFF  1,947,400
LUBRICATING ARRANGEMENT FOR MAGNETO-ELECTRIC IGNITION APPARATUS
Filed Dec. 5, 1931
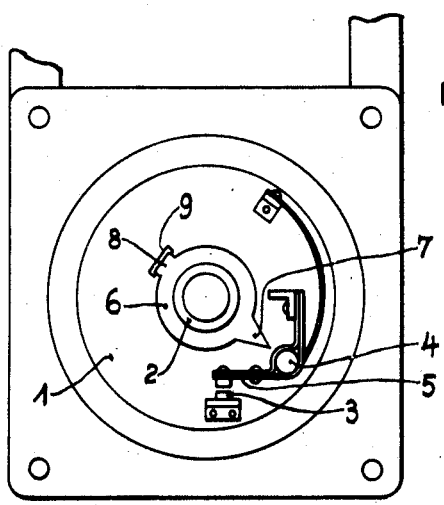
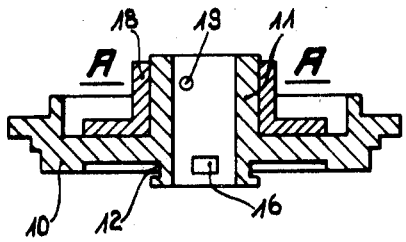
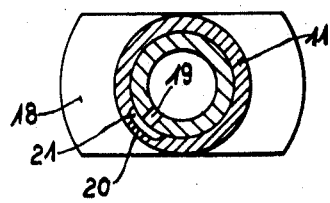
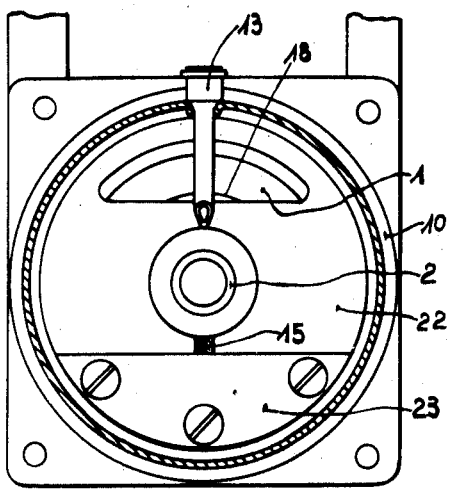
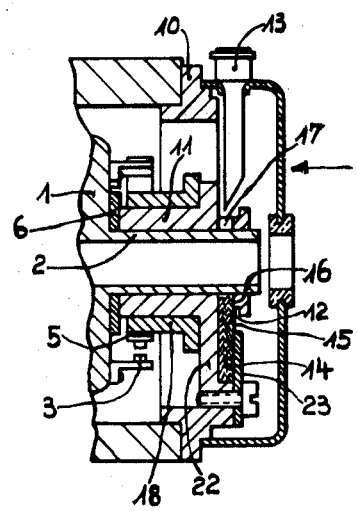
Inventor
Fritz Allendorff
by Steward & McKay
his attorneys Patented Feb. 13, 1934

1,947,400

UNITED STATES PATENT OFFICE 1,947,400

LUBRICATING ARRANGEMENT FOR MAGNETO-ELECTRIC IGNITION APPARATUS

Fritz Allendorff, Stuttgart, Germany, assignor to Robert Bosch Aktiengesellschaft, Stuttgart, Germany Application December 5, 1931, Serial No. 579,335, and in Germany December 19, 1930

6 Claims. (Cl. 200—19)

The invention relates to a lubricating arrangement for magneto electric ignition apparatus having a rotating interrupter plate and a stationary cam adjustably arranged on a bearing bush.

In the known constructions oil which emerges at the end of the bearing bush facing the interrupter plate spreads over the entire surface of the rotating plate in consequence of centrifugal action of the said plate. It even reaches the interrupter contacts and contributes in an undesirable degree to their wear.

According to the invention, this drawback is removed on the one hand, and a good lubrication of the rocking interrupter lever attained on the other hand, by arranging a disc rotating with the interrupter plate, between the bearing bush and the interrupter plate, a feed projection being directed towards the pin or pivot of the rocking lever.

An example of construction of the invention is shown in the drawing, in which:—

Figure 1 is an elevation of the interrupter plate.

Figure 2 a horizontal section through the cover of the bearing.

Figure 3 a section on the line A—A of Figure 2.

Figure 4 a vertical section through the interrupter and the bearing.

Figure 5 an elevation of Figure 4 as seen in the direction of the arrow.

The rotating interrupter plate 1 to which is secured the fixed contact 3 and the bearing pin 4 of the rocking interrupter lever 5, has an extension in the form of a hollow pin 2. On the hollow pin 2 is mounted a non-circular disc 6, which has a projection 7 directed towards the pin 4. The disc 6 is fixed in its position with regard to the interrupter plate 1 by a stop 8, which engages in a recess 9 in the interrupter plate 1.

The cover 10 of the casing of the interrupter has a hub portion 11, which forms simultaneously a bearing bush for the hollow pin 2 and a bearing pin for the cam 18. This hub 11 has an annular groove 12 (see Fig. 2), which catches the oil from the lubricator 13 and leads it by means of a wick 15 to a supply chamber 14 formed by the wall 22 of the cover 10 and a sheet metal piece 23, and the wick bears through an opening 16 in the hub on the hollow pin 2. In addition, there is a second opening 17 in the hub below the lubricator through which the lubricating oil can directly reach the journal.

To lubricate the outer surface of the cam 18, a passage 19 is provided in the bearing bush 11 and a passage 20 in the cam. Through these passages the oil running along the hollow pin 2 can reach the outer surface of the cam 18.

In order that, when adjusting the cam, its lubrication may not be interrupted, an arcuate recess 21 is provided on the inner side of the cam around the lubricating hole 20.

The pivot pin 4 of the interrupter lever 5 is lubricated by the oil which runs along the hollow pin 2 as far as the disc 6 rotating with the latter, and collects at the projection 7 of this disc and is thrown by the centrifugal action against the pin 4.

I declare, that what I claim is:

1. In a magneto, a rotary interrupter plate, a bearing cover, a hub thereon, a stationary cam on said hub, a rocking lever on said plate, a pivot carrying said lever, a pair of contacts one of which is operated by said lever, a disc rotating with said plate and a feed projection on said disc directed towards said pivot.

2. In a magneto, a rotary interrupter plate, a bearing cover, a hub on said cover having lubricating passages therein, a lubricant feed pipe leading thereto, a stationary cam on said hub, a rocking lever, a pivot on said plate carrying said lever, a pair of contacts one of which is operated by said lever, a disc rotating with said plate abutting against lubricating passages, and a feed projection on said disc directed towards said pivot.

3. In a magneto, a rotary interrupter plate, a bearing cover, a hub on said cover having lubricating passages therein, a lubricant feed pipe leading thereto, a stationary cam on said hub having an arcuate lubricant recess therein, a rocking lever, a pivot on said plate carrying said lever, a pair of contacts one of which is operated by said lever, a disc rotating with said plate abutting against lubricating passages, and a feed projection on said disc directed towards said pivot.

4. In a magneto having a rotary interrupter plate and a pin rotatable therewith, a bearing for said pin, a rocking lever on said plate, a pivot carrying said lever, a pair of contacts one of which is operated by said lever, means for supplying lubricant to said bearing, and rotatable means receiving lubricant from said bearing and delivering it to said pivot.

5. In a device of the character described, a member provided with a bearing bush, a hollow pin rotatable in said bush, means for feeding lubricant to said bush and pin, and a stationary cam mounted on said bush, said bush and cam being provided with registering passages to receive and supply lubricant to said cam.

6. In an ignition device having a rotary interrupter plate, a stationary cam, a rocking lever on said plate, a pivot carrying said lever, a pair of contacts one of which is operated by said lever, and a disk rotatable with said plate and provided with a feed projection directed towards said pivot.

FRITZ ALLENDORFF.